United States Patent [19]

Calabro

[11] Patent Number: 5,227,151

[45] Date of Patent: Jul. 13, 1993

[54] METHOD OF PREPARING SILICOALUMINOPHOSPHATE COMPOSITIONS USING A REAGENT CONTAINING BOTH QUATERNARY AMMONIUM AND SILICON REACTIVE SITES IN THE SAME MOLECULE

[75] Inventor: David C. Calabro, Somerset, N.J.

[73] Assignee: Mobil Oil Corporation, Fairfax, Va.

[21] Appl. No.: 792,573

[22] Filed: Nov. 15, 1991

[51] Int. Cl.[5] ............... C01B 33/34; C01B 25/36; B01J 27/182; B01J 27/12
[52] U.S. Cl. .................... 423/703; 423/705; 423/DIG. 30; 502/214
[58] Field of Search .............. 502/214, 158, 164; 423/306, 305, 328.1, 328.2, 703, 705

[56] References Cited

U.S. PATENT DOCUMENTS

| | | | |
|---|---|---|---|
| 3,560,385 | 2/1971 | Roth | 252/49.6 |
| 3,730,701 | 5/1973 | Isquith et al. | 71/67 |
| 4,298,500 | 11/1981 | Abbott | 502/7 |
| 4,440,871 | 4/1984 | Lok et al. | 502/214 |
| 4,673,559 | 6/1987 | Derouane et al. | 423/306 |
| 4,778,780 | 10/1988 | Valyoscik | 502/214 |

*Primary Examiner*—Paul E. Konopka
*Attorney, Agent, or Firm*—Alexander J. McKillop; Dennis P. Santini; Laurence P. Hobbes

[57] ABSTRACT

A method of preparing silicoaluminophosphate (SAPO) compositions from a forming mixture which comprises sources of oxides of silicon, aluminum and phosphorus and quaternary ammonium-functionalized organosiliconate directing agent wherein the oxides of silicon are provided at least in part by said directing agent, e.g., N-trimethoxysilylpropyl-N,N,N-trimethylammonium chloride.

8 Claims, No Drawings

METHOD OF PREPARING SILICOALUMINOPHOSPHATE COMPOSITIONS USING A REAGENT CONTAINING BOTH QUATERNARY AMMONIUM AND SILICON REACTIVE SITES IN THE SAME MOLECULE

This application is related by subject matter to Ser. No. 07/792,572, filed on even date herewith.

FIELD OF THE INVENTION

This invention relates to a method for preparing crystalline silicoaluminophosphates (SAPOs) from a forming mixture containing quaternary ammonium-functionalized organosiliconate as a directing agent.

More particularly, this invention relates to an improved method of preparing silicoaluminophosphate compositions wherein quaternary ammonium-functionalized organosiliconates are used as a source of silicon atoms in the forming mixture whereby the incorporation of silicon into the growing aluminophosphate framework is facilitated by virtue of the organosiliconate providing silicon directly attached to the organic directing agent.

Partial substitution of silicon for phosphorus in aluminophosphate frameworks in order to generate catalytically active acid sites has been a longstanding goal of molecular sieve science. For the most part, significant catalytic activity has not been achieved. This may result from the bulk silicon content being present as coprecipitated silica, or, as silicon-rich islands within the framework affording few active Si-O-Al interactions. The present invention avoids such conditions by utilizing as a source of framework silicon, ammonium-functionalized organosiliconates which contain a Si-C bond which is believed to suppress self-condensation and concomitant silicon-rich oxide phases. The use of ammonium-functionalized organosiliconate as directing agent is believed unique in crystalline silicate synthesis. Such directing agents contain a quaternary ammonium templating center covalently linked by a hydrocarbon chain to a siloxane site which can be incorporated into the growing silica framework, thereby facilitating encapsulation of the template into the growing framework. Another feature of the use of such directing agents is their provision of both a source of silicon for incorporation into the aluminophosphate framework as well as a quaternary ammonium templating moiety.

Crystalline, microporous silicoaluminophosphates are described in the Lok et al U.S. Pat. No. 4,440,871, the entire disclosure of which is expressly incorporated herein by reference. The present invention is particularly suited to preparation of SAPOs such as MCM-1, and MCM-9 as described in U.S. Pat. No. 4,673,559, the disclosure of which is expressly incorporated herein by reference.

The present invention provides a method of preparing a silicoaluminophosphate composition comprising crystals having a framework topology from a forming mixture which method comprises (i) preparing a mixture capable of forming said composition, said mixture comprising a source or sources of (a) an oxide of silicon, (b) an oxide of aluminum, (c) an oxide of phosphorus, and (d) an ammonium-functionalized organosiliconate directing agent wherein said source of (a) is provided by said directing agent; and (ii) maintaining said mixture under conditions sufficient to form said composition.

Silicoaluminophosphates are generally prepared from a forming mixture containing sources of oxides of silicon, aluminum and phosphorus. The forming mixture may be an aqueous and/or organic medium. The mixture may also contain an organic templating agent as known in the silicoaluminophosphate synthesis art, e.g., tetraalkyl- ammonium ion. Examples of such templating agents include tetramethylammonium hydroxide (TMAOH), tetraethylammonium hydroxide (TEAOH), and tetrapropylammonium hydroxide (TPAOH).

Sources of aluminum oxide include, as non-limiting examples, any known form of aluminum oxide or hydroxide, organic or inorganic salt or compound. Sources of silicon oxide besides those specified as required by the present invention include, as non-limiting examples, any known form of silicic acid or silicon dioxide, alkoxy- or other compounds of silicon. Sources of phosphorus oxide include, as non-limiting examples, any known form of phosphorus acids or phosphorus oxides, phosphates and phosphites, and organic derivatives of phosphorus. Further details relating to formation of the forming mixtures for silicoaluminophosphate compositions, including molar amounts of each oxide source can be found in the aforementioned U.S. Pat. No. 4,440,871.

Quaternary ammonium functionalized organosiliconates are believed to be unique as directing agents in crystalline silicate synthesis by virtue of their inclusion of a potential framework T-atom bound covalently to the cationic center. These compounds are characterized by $(RO)_3Si$-functionalized via a Si-C bond with a variety of organic substituents. Covalently linking the directing agent (or template) to the framework facilitates encapsulation during the very early stages of silicate polymerization and precursor formation. These organosiliconates have a diverse range of commercial applications including use as coupling agents for plastics reinforcements, detergents, scale inhibition, dispersants, antimicrobials and adhesives.

Suitable organosilicon quaternary ammonium salts for use in the present invention can be represented by the formula:

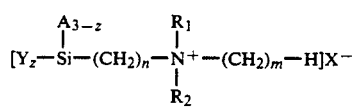

wherein
Y is a hydrolyzable radical, e.g. one selected from hydroxy, aryloxy and alkoxy;
X is an anion such as halide, preferably bromide or chlorine, or other negative species such as sulfate, phosphate, hydroxide and carbonate;
$R_1$ is an alkyl radical of 1 to 4 carbon atoms such as methyl, ethyl, propyl, isopropyl, butyl or isobutyl, and preferably methyl;
$R_2$ is an aliphatic radical of 1 to 4 carbon atoms such as methyl, ethyl, propyl, isopropyl, butyl or isobutyl, or an aromatic radical of 6 to 8 carbons such as benzyl or ethyl benzyl;
A is an aliphatic radical of 1 to 4 carbons or an aromatic radical of 6 to 8 carbons;
n is 1 to 6;
m is 1 to 18; and
z is 2 to 3.

Preferably these materials are added to the silicoaluminophosphate reaction mixture in a buffered aqueous/organic vehicle.

Referring to the above formula of the organosilicon quaternary ammonium salts, the following should be noted. Hydrolyzable radicals include: aryloxy groups, such as phenoxy, alkoxy groups containing up to 4 carbon atoms, such as methoxy, ethoxy, isopropoxy, propoxy and butoxy; and halogens such as chlorine, bromine and iodine, and other negative ionic species as well, e.g., hydroxide.

Examples of compounds contemplated for use in the present invention include:
hexadecyldimethyl[3-(triethoxysilyl)propyl]ammonium chloride,
hexadecyldimethyl[3(trimethoxysilyl)propyl]ammonium chloride,
octadecyldimethyl[3-(trimethoxysilyl)propyl]ammonium chloride,
stearylmethylbenzyl[3-(triethoxysilyl)propyl]ammonium chloride,
stearylmethylbenzyl[3-(trimethoxysilyl)propyl]ammonium chloride,
stearylmethylethylbenzyl[3-(triethoxysilyl)propyl]ammonium chloride,
stearylmethylethylbenzyl[3-(trimethoxysilyl)propyl]ammonium chloride,
tetradecyldimethyl[3-(triethoxysilyl)propyl]ammonium chloride,
tetradecyldimethyl[3-(trimethoxysilyl)propyl]ammonium chloride,
N-triethoxysilylpropyl-N,N,N-trimethylammonium chloride,
N-trimethoxysilylpropyl-N,N,N-trimethylammonium chloride,
N-trimethoxysilylpropyl-N,N,N-tri-n-butylammonium bromide and
N-trimethoxysilylpropyl-N,N,N-tri-n-butylammonium hydroxide.

Organosilicon quaternary ammonium salts used in the present invention are available commercially or can be prepared by art-recognized methods. For example, octadecyldimethyl[3-(trimethoxysilyl)propyl]ammonium chloride, and N-trimethoxysilyl N,N,N-trimethyl propylammonium chloride and tetradecyldimethyl[3-(trimethoxysilyl)propyl]ammonium chloride are commercially available from Petrarch Systems, Inc., Bristol, Pa. Other organosilicon quaternary ammonium salts of the present invention can be readily prepared utilizing procedures described in U.S. Pat. Nos. 3,560,385 and 3,730,701. In general, compounds of the stated formula can be readily synthesized by heating at reflux temperature in a polar solvent such as methanol, ethanol and acetone, an excess of an amine of the formula:

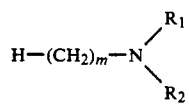

wherein $R_1$, $R_2$ and m are as above-defined, with a silane quaternizing agent of the formula:

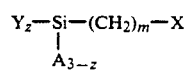

wherein
X, Y and n are as above-defined, and
z is 2 or 3.

These materials are particularly useful in reaction mixtures used in preparing silicoaluminophosphates which are maintained at relatively low pH, say 4 to 7. The ammonium-functionalized organosiliconates are known to stabilize silicate solutions down to pHs of 2 or less and are thus likely to remain intact throughout silicoalumino-phosphate synthesis.

Crystallization conditions for the forming mixture generally include maintaining the mixture at temperatures of at least 100° C. for a time sufficient to effect crystallization. Further details regarding crystallization conditions can be found in U.S. Pat. No. 4,440,871.

The method of synthesis can be either in a batch process, semicontinuous or continuous process. In a continuous or semicontinuous process, a forming solution or slurry is passed through the reaction zone with or without recycle. In the recycle mode, the composition of the solution can be adjusted and maintained at optimal concentrations.

The crystalline silicoaluminophosphate material may also be calcined before or after removal from the substrate for example in an inert atmosphere or in air at from about 200° to about 700° C. for about 1 hr. to about 50 hrs.

The crystalline silicoaluminophosphate may also be treated to adjust its catalytic properties before or after removal from the surface, for example by steaming and/or ion exchange. Low or zero catalytic activity can be obtained by incorporating alkali or alkaline earth cations Catalytic activity can be increased by methods known in the art such as by increasing the aluminum content or by introducing a hydrogenation-dehydrogenation function.

The original ions, i.e. cations or anions, of the synthesized crystalline silicoaluminophosphate can be replaced in accordance with techniques well known in the art, at least in part, by ion exchange with other cations or anions. Preferred replacing cations include metal ions, hydrogen ions, hydrogen precursor, e.g., ammonium ions and mixtures thereof. Particularly preferred cations include hydrogen, rare earth metals and metals of Groups IIA, IIIA, IVA, IB, IIB, IIIB, IVB, VIB and VIII of the Periodic Table of the Elements.

Typical ion exchange technique would be to contact the synthesized material with a salt of the desired replacing ion or ions. Examples of such salts of cations include the halides, e.g., chlorides, nitrates and sulfates.

Cations may be incorporated into the silicoaluminophosphate to neutralize acid sites or to adjust the diffusion properties; preferred cations to be incorporated for these purposes include metals of Groups IA and IIA of the Periodic Table of the Elements, for example, sodium, potassium, magnesium, barium, lithium, strontium, rubidium and cesium.

Other metals can be incorporated during synthesis (e.g., titanium, tin, iron, gallium, transition metals) or post-synthetically via known processes such as impregnation, ion exchange, vapor deposition and the like.

It is also contemplated that additional metal functions can be incorporated into the crystalline silicoaluminophosphate, such as Pd, Pt, Ru, Mo, W, Ni, Fe, Ag, etc. These metal-containing materials may have essentially no acid activity, or they may have substantial acid activity to provide for dual-functional catalysis. The catalytic activity of the membrane can be adjusted from essentially zero to high activity, depending on the particular use thereof.

Activity may be correlated with acid character. Substitution of a pentavalent element such as phosphorus by a tetravalent element such as silicon introduces a negative charge which must be balanced. If this is done by a proton, the material is acidic. The charge may also be balanced by cation exchange with alkali or alkaline earth metal cations.

One measure of catalytic activity may be termed the Alpha Value. When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, vol. 61, p. 395.

The crystalline silicoaluminophosphates of the present invention ar readily convertible to catalytically active material for a variety of organic, e.g., hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 hr$^{-1}$ to about 20 hr$^{-1}$; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g., benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20 converting alcohols, e.g., methanol, or ethers, e.g., dimethylether, or mixtures thereof to hydrocarbons including olefins and/or aromatics with reaction conditions including a temperature of from about 275° C. to about 600° C., a pressure of from about 0.5 atmosphere to about 50 atmospheres and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g., benzene and alkylbenzenes in the presence of an alkylating agent, e.g., olefins, formaldehyde, alkyl halides and alcohols, with reaction conditions including a temperature of from about 250° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In general, therefore, catalytic conversion conditions over a catalyst comprising the crystalline silicoaluminophosphate in active form include a temperature of from about 100° C. to about 760° C., a pressure of from about 0.1 atmosphere (bar) to about 200 atmospheres (bar), a weight hourly space velocity of from about 0.08 hr$^{-1}$ to about 2000 hr$^{-1}$ and a hydrogen/organic, e.g., hydrocarbon compound mole ratio of from 0 (no added hydrogen) to about 100.

In order to more fully illustrate the nature of the invention and the manner of practicing same, the following examples are presented.

EXAMPLE 1

A product containing predominantly MCM-9 was obtained as follows: A 250 ml beaker was charged with 11.8 g Catapal B ™ alumina, then 26.0 g distilled water with stirring. To this mixture was added 8.6 g of a 50% aqueous solution of N-trimethoxysilylpropyltri-N-butylammonium bromide, then 20.2 g 85% phosphoric acid. This mixture was stirred to homogenize, then aged without stirring for 2 hours. 42.7 g 55% tetrabutylammonium hydroxide was then added, the mixture was stirred for an additional 2 hours. Finally, this aged mixture was charged to a 250 ml, Teflon ™-lined Parr bomb and placed into a 150° C. oven for 20 hours. The product mixture was successively decanted and re-suspended in fresh distilled water 8-10 times, then allowed to air dry. Yield: 6.73 g, silicon content=0.020 wt. %.

EXAMPLE 2

MCM-1 is prepared in accordance with the present invention as follows: A 250 ml beaker was charged in order with 11.82 g Catapal B ™ alumina, 26.3 g distilled water, 22.6 g 85% phosphoric acid and an additional 15.5 g distilled water while stirring. This mixture was allowed to sit without stirring for two hours, whereupon 36.5 g 0.81M aqueous solution of N-trimethoxysilylpropyltri-N-butylammonium hydroxide and 35.7 55% tetrabutylammonium hydroxide were added and the mixture was stirred for two hours. This final aged mixture was heated at 150° C. in a Teflon ™-lined Parr bomb for 20 hours, cooled, decanted and washed 7 times with 50 cc aliquats of distilled water, then air dried. Yield: 10.53 g, silicon content=0.15 wt. %.

It is claimed:

1. A method of preparing a silicoaluminophosphate composition comprising crystals having a framework topology from a forming mixture which comprises (i)

preparing a mixture capable of forming said composition, said mixture comprising a source or sources of (a) an oxide of silicon, (b) an oxide of aluminum, (c) an oxide of phosphorus, (d) an organosilicon quaternary ammonium directing agent wherein said source of (a) comprises said directing agent, and (e) a tetraalkylammonium ion templating agent; and (ii) maintaining said mixture under conditions sufficient to form said composition.

2. The method of claim 1 wherein said organosilicon quaternary ammonium has the formula

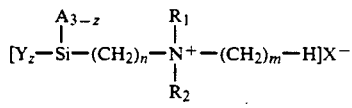

wherein

Y is a hydrolyzable radical;

X is a halogen or anion selected from sulfate, phosphate, hydroxide, and carbonate;

$R_1$ is an alkyl radical of 1 to 4 carbon atoms;

$R_2$ is an aliphatic radical of 1 to 4 carbon atoms or an aromatic radical of 6 to 8 carbons;

A is an aliphatic radical of 1 to 4 carbons or an aromatic radical of 6 to 8 carbons;

m is 1 to 18;

n is 1 to 6; and z is 2 to 3.

3. The method of claim 1 wherein said organosilicon quaternary ammonium is N-trimethoxylsilylpropyl-N,N,N-trimethylammonium chloride.

4. The method of claim 3 wherein said organosilicon quaternary ammonium is N-trimethoxysilylpropyl-N,N,N-tri-n-butylammonium bromide.

5. The method of claim 3 wherein said organosilicon quaternary ammonium is N-trimethoxysilylpropyl-N,N,N-tri-n-butylammonium hydroxide.

6. The method of claim 1 wherein said silicoaluminophosphate composition is selected from the group consisting of MCM-1 and MCM-9.

7. The method of claim 1 wherein said silicoaluminophosphate composition is MCM-1.

8. The method of claim 1 wherein said silicoaluminophosphate composition is MCM-9.

* * * * *